No. 841,744. PATENTED JAN. 22, 1907.
F. W. WALQUIST.
LINING TUBES.
APPLICATION FILED MAY 4, 1906.
4 SHEETS—SHEET 1.
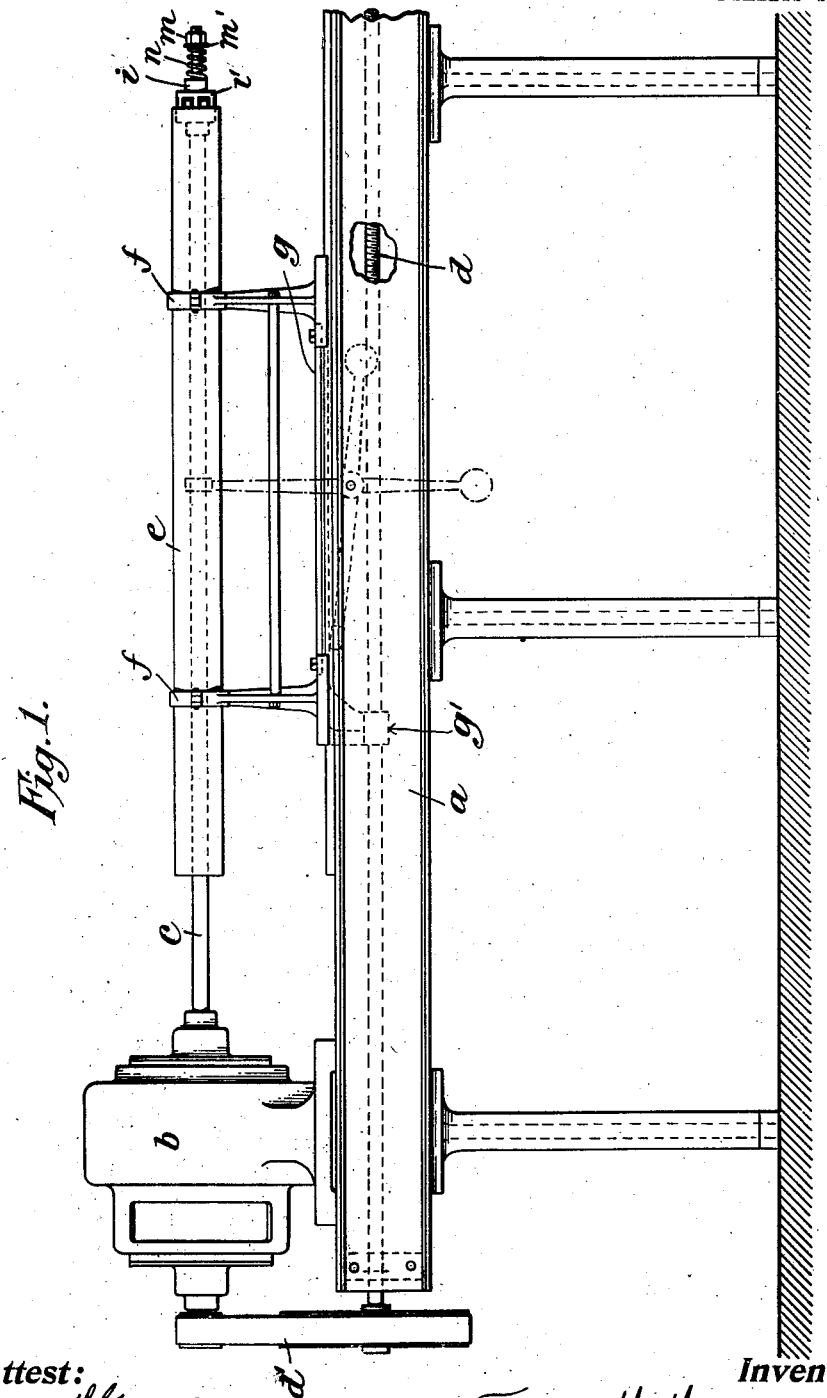

No. 841,744. PATENTED JAN. 22, 1907.
F. W. WALQUIST.
LINING TUBES.
APPLICATION FILED MAY 4, 1906.
4 SHEETS—SHEET 2.
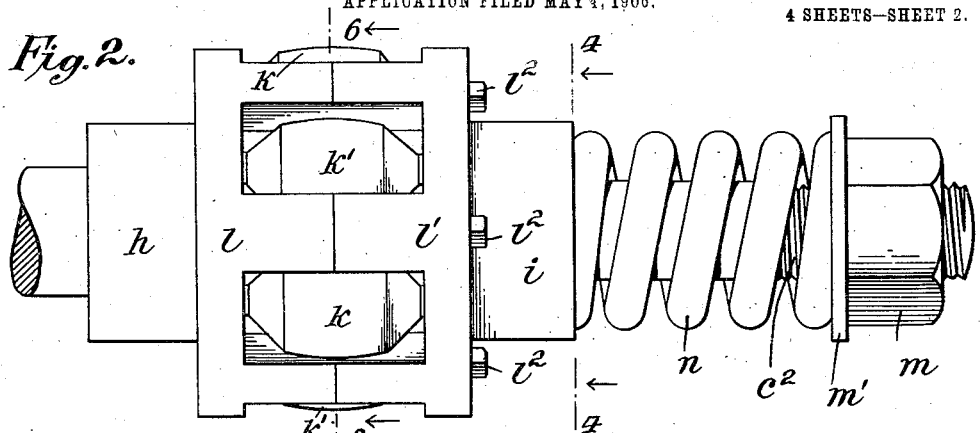
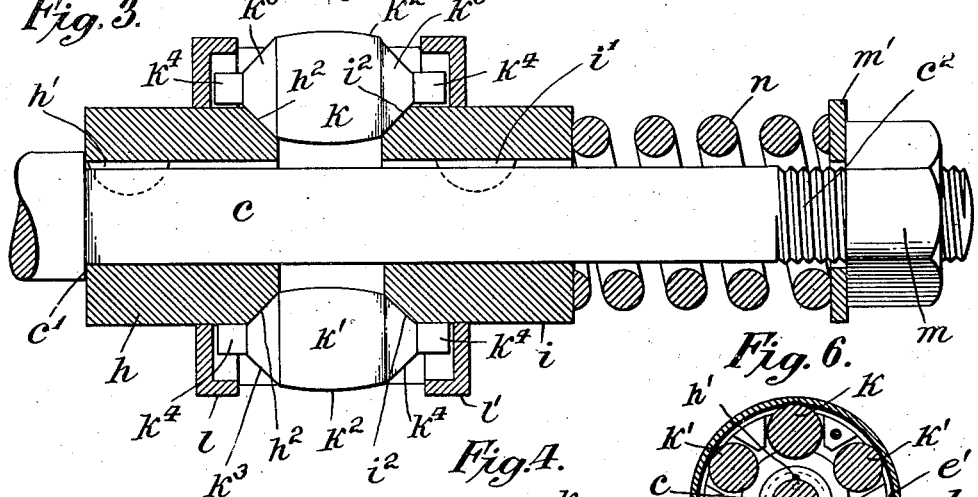
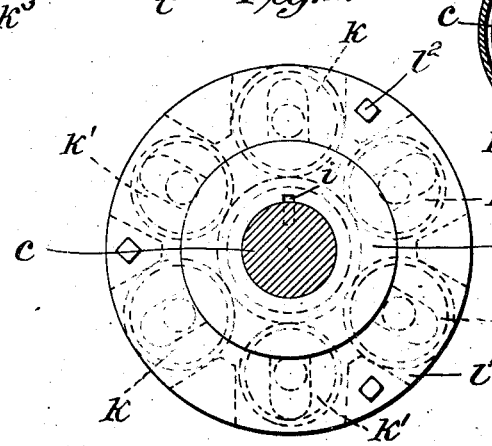
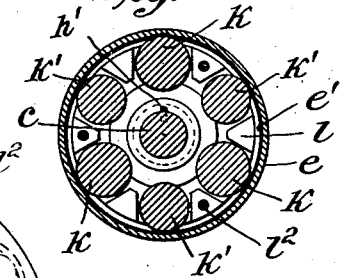
Attest:
Inventor:
Frank W. Walquist
by Redding, Kiddle & Greeley
Attys.

No. 841,744. PATENTED JAN. 22, 1907.
F. W. WALQUIST.
LINING TUBES.
APPLICATION FILED MAY 4, 1906.
4 SHEETS—SHEET 3.
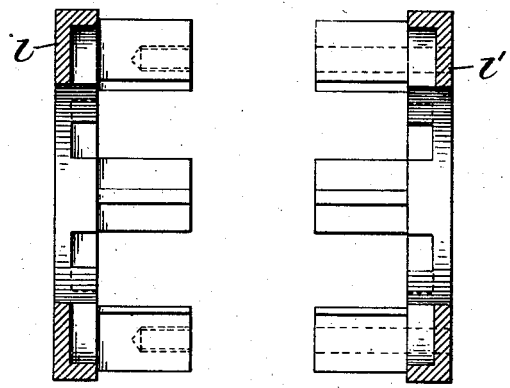
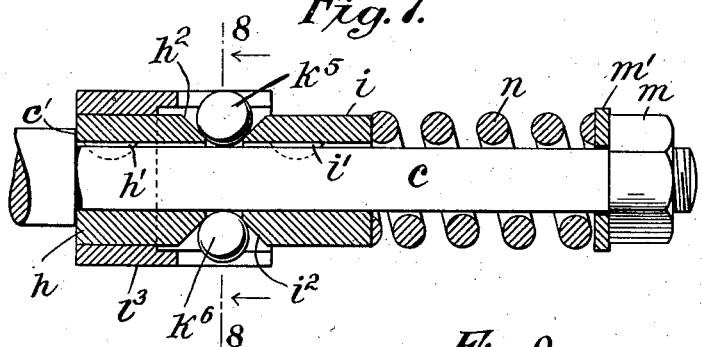
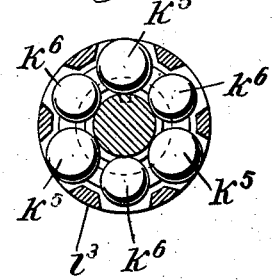
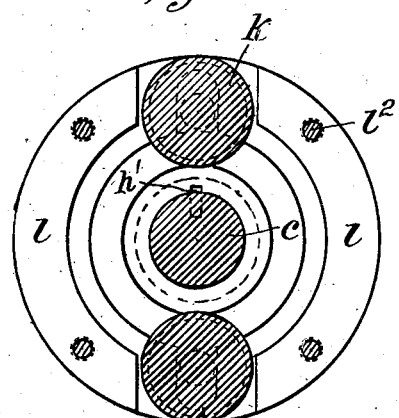
Attest: Inventor:
Edgeworth Greene Frank W. Walquist
Ella J. Kruger by Redding, Kiddle & Greeley
Attys.

No. 841,744. PATENTED JAN. 22, 1907.
F. W. WALQUIST.
LINING TUBES.
APPLICATION FILED MAY 4, 1906.
4 SHEETS—SHEET 4.
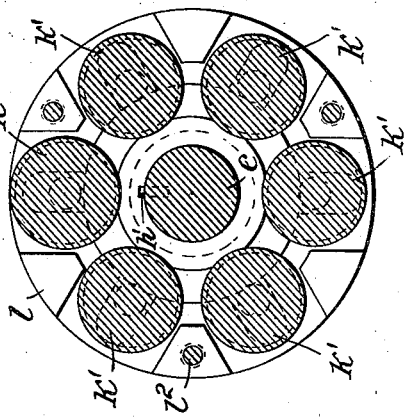
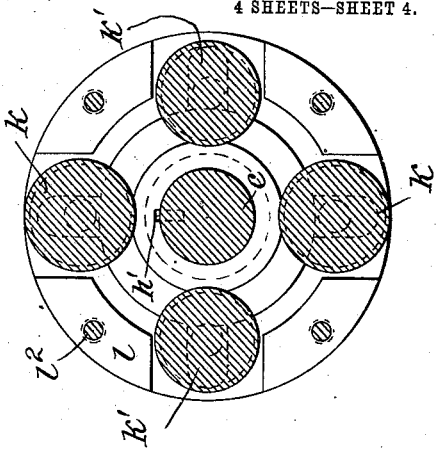
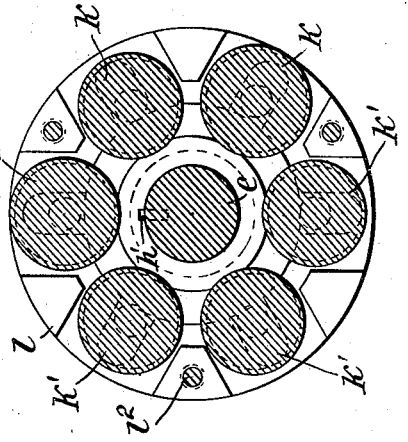
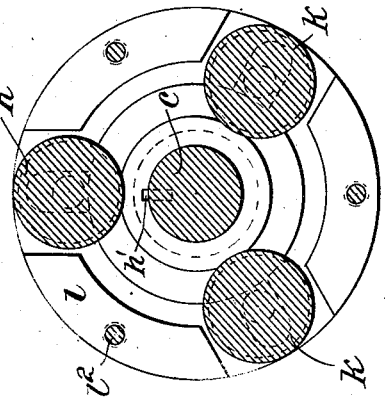
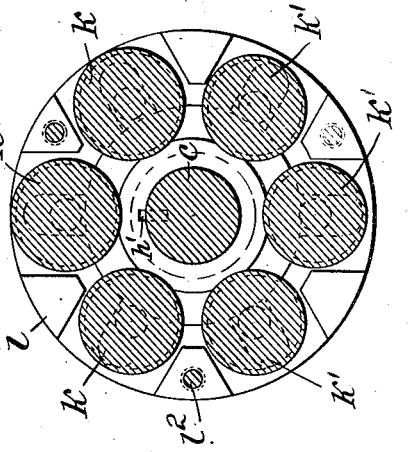
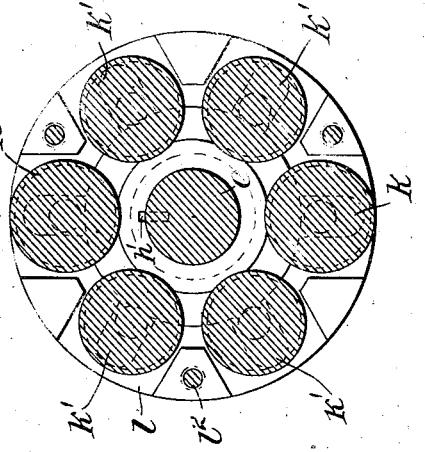
Attest:
Inventor:
Frank W. Walquist
by Redding, Kiddle & Greeley
Attys.

UNITED STATES PATENT OFFICE.

FRANK W. WALQUIST, OF NEW YORK, N. Y., ASSIGNOR TO SCHNEIBLE COMPANY, OF WEEHAWKEN, NEW JERSEY, A CORPORATION OF NEW JERSEY.

LINING-TUBE.

No. 841,744.　　　Specification of Letters Patent.　　　Patented Jan. 22, 1907.

Application filed May 4, 1906. Serial No. 315,252.

*To all whom it may concern:*

Be it known that I, FRANK W. WALQUIST, a citizen of the United States, residing in the borough of Brooklyn, city of New York, State of New York, have invented certain new and useful Improvements in Lining-Tubes, of which the following is a specification, reference being had to the accompanying drawings, forming a part hereof.

Tubes for coolers, condensers, and for many other uses are commonly made, for economy and strength, of steel or iron. It is highly desirable in many cases, however, that such tubes of steel or iron should be lined with copper or tin or some metal which is less affected by the gas or liquid which passes through the tubes. If such tubes were perfectly true, the lining thereof with tin or copper could be effected easily in various ways. The fact is, however, that such tubes are not and cannot be made perfectly true without great expense.

It is accordingly the object of this invention to make it possible to line tubes of iron or steel or other metal which may depart more or less internally from a truly cylindrical form with other metal, such as copper or tin.

In practicing the invention a lining-tube of copper or tin or other desired metal of such external diameter as to be capable of being slipped within the tube to be lined is selected, and the lining-tube is then expanded into close and intimate contact with the outer tube at all points. This is accomplished by a mechanical expander which is caused to traverse the tube internally from end to end.

The mechanism in an approved form will be more fully described hereinafter with reference to the accompanying drawings, in which it is illustrated and in which—

Figure 1 is a view in front elevation, partly broken off to save space, of a mechanism which embodies the invention. Fig. 2 is a view in side elevation and on a larger scale of the expander. Fig. 3 is a view thereof in longitudinal section, with the shaft and rollers in elevation. Fig. 4 is a view in transverse section on the plane indicated by the line 4 4 of Fig. 2 looking in the direction of the arrow. Fig. 5 is a sectional view of the roller-retaining cage with the bolts withdrawn and the members separated. Fig. 6 is a view in section on the plane indicated by the line 6 6 of Fig. 2, but on a smaller scale and with the tube to be lined and the lining-tube shown therein. Fig. 7 is a view similar to Fig. 3, but showing a slightly different form of the expander. Fig. 8 is a view in section on the plane indicated by the line 8 8 of Fig. 7. Figs. 9–15 are detail views, in central transverse section, of the expander, illustrating different arrangements of the expanding-rollers.

The device for supporting and operating the expander and the tubes obviously may be of any suitable character, the particular construction and arrangement thereof depending to some extent upon the size and character of the tubes to be lined and upon whether it is more convenient to rotate or to traverse the expanders with respect to the tube or the tube with respect to the expander.

As shown in Fig. 1 of the drawings, the mechanism may embody a suitable bed $a$, like a lathe-bed, which may have mounted thereon a motor or driving-head $b$. From the driving-head is extended a shaft $c$, which should have a length as great as that of the tubes to be operated upon and carries at or near its outer extremity the expander, as hereinafter described. The feed-screw $d$ may be mounted in the bed $a$ and driven through suitable mechanism $d'$ for the purpose of causing the longitudinal traverse of the tubes operated upon. As shown in Fig. 1, the tube $e$ to be lined is secured in clamps $f$, which are mounted upon a carriage $g$, engaged, as indicated by dotted lines at $g'$, by the feed-screw $d$, so that the tube to be lined with its lining-tube $e'$ (shown in Fig. 6) may be traversed from end to end with respect to the expander.

The preferred form of the expander is illustrated in detail in Figs. 2, 3, 4, and 5. It comprises two sleeve-like members $h$ and $i$, one of which, $h$, is keyed, as at $h'$, or otherwise fixed upon the shaft $c$ near its end, while the other, $i$, is mounted so as to turn with the shaft $c$ and to move longitudinally thereon, being preferably splined on the shaft, as at $i'$. The adjacent ends of the two sleeves $h$ and $i$ are beveled, as at $h^2$ and $i^2$, respectively, to form a seat for beveled rollers $k\ k'$. To retain the rollers in place when not in operation, a cage may be provided comprising two members $l$ and $l'$, secured together by bolts $l^2$, such cage being mounted loosely upon the members $h$ and $i$. The end of the shaft $c$, which is preferably reduced, as shown, to form a shoulder $c'$ for coöperation with the sleeve member $h$ of the expander, is threaded at its end $c^2$ to receive the nut $m$, which acts, through a washer $m'$ and a spring $n$, upon the longitudinally-movable member $i$ of the expander.

In operation the tube $e$ to be lined having been secured in the carriage $g$, the expander is introduced within the end of the tube and its lining, and the nut $m$ is set up until, through the spring $n$ and the action of the tapered ends $h^2$ and $i^2$, the rollers $k$ and $k'$ are forced outwardly against the lining-tube with the degree of pressure necessary to expand it into intimate contact with the tube $e$. Two opposite rollers $k\ k$, as shown in Fig. 9, will suffice in some cases; but it is generally desirable to provide a larger number of rollers in order that the lining-tube $e'$ may be supported at many points about its internal circumference, and the expansion thereof into intimate contact with the tube $e$ be made thereby the more certain. If two rollers are only employed, as shown in Fig. 9, they are preferably of equal diameter. They may also be of equal diameter when three rollers are employed, as shown in Fig. 14. If four or more rollers are employed, as indicated in Figs. 4, 6, 10, 11, 12, 13, and 15, one or more of the rollers, as $k$, have the maximum diameter, while the remaining rollers of the set, as $k'$, are of smaller diameter. The rollers $k$ of the maximum diameter act more particularly as expanders to force the lining-tube into inequalities in the other tube, as indicated at the top of Fig. 6, while the other rollers, as $k'$, act more as carriers to hold the lining-tube outwardly and to prevent a mere bend in the metal from following the expanding-roller around the tube in the rotation of one with respect to the other. In Figs. 2 and 3 the rollers $k$ and $k'$ are represented as having a slightly convex operating-surface $k^2$, tapered shoulders $k^3$ to coöperate with the tapered ends $i^2$ and $h^2$ of the sleeves $h$ and $i$, and reduced ends or pintles $k^4$ to coöperate with the cage $l\ l'$. Balls $k^5$ and $k^6$ might, however, be used as rollers, as shown in Figs. 7 and 8. The construction of the expander in other respects remains as before, except that the cage $l^3$ may be modified in form to coöpera e with the balls. The inclined or tapered ends $h^2$ and $i^2$ of the sleeve members $h$ and $i$ coöperate directly with the balls to force them outwardly.

It will now be understood that when the tube and its lining have been assembled and secured in the clamps and the expander introduced at one end, the required pressure being secured by setting up the nut $m$, the shaft $c$ is made to rotate rapidly, and at the same time the tubes are fed forward to cause the expander to traverse the device from one end to the other. The effect of this operation is to expand the lining-tube into intimate contact with the outer tube at all points regardless of such inequalities in the inner surface of the outer tube as may have resulted from the process of manufacture of the outer tube. The operation of lining tubes is thus conducted with great rapidity, and the union between the outer tube and the lining is for all practical purposes as efficient as a welded or brazed or soldered union.

It will be obvious that, if desired, the expander might be made to travel longitudinally as well as to rotate and that the device might be made to rotate while the expander is held stationary and that various other modifications in the construction of the apparatus might be made to suit different conditions of use without departing from the spirit of the invention.

I claim as my invention—

1. A machine for lining tubes with expansible tubes comprising a holder for the tube and its lining, an expander adapted to act internally upon the lining from end to end, means to rotate one of said parts with respect to the other and means to traverse one of said parts longitudinally with respect to the other simultaneously with the action of the expander upon the lining.

2. A machine for lining tubes with expansible tubes comprising a holder for the tube and its lining, a spring-actuated expander adapted to act internally upon the lining, means to rotate one of said parts with respect to the other and means to traverse one of said parts longitudinally with respect to the other.

3. A machine for lining tubes with expansible tubes comprising a holder for the tube and its lining, an expander consisting of a plurality of rollers and devices to press such rollers yieldingly outward, means to rotate one of said first-named parts with respect to the other and means to traverse one of said first-named parts longitudinally with respect to the other.

4. A machine for lining tubes with expansible tubes comprising a holder for the tube and its lining, an expander consisting of a plurality of rollers, sleeves with tapered ends forming seats for said rollers and means to press one of said sleeves yieldingly toward the other, means to rotate one of said first-named parts with respect to the other and means to traverse one of said parts longitudinally with respect to the other.

5. A machine for lining tubes with expansible tubes comprising a carriage having clamps for the tube and its lining, means to traverse said carriage longitudinally simultaneously with the action of the hereinafter-mentioned expander, a driving-head, a shaft carried thereby and an expander mounted on said shaft to act internally upon the lining from end to end.

6. A machine for lining tubes with expansible tubes comprising a carriage having clamps for the tube and its lining, means to traverse said carriage longitudinally, a driving-head, a shaft carried thereby and an expander comprising sleeves with tapered ends mounted on said shaft, one of said sleeves being movable yieldingly toward and from the other, and rollers seated upon the tapered ends of said sleeves.

7. A machine for lining tubes with expansible tubes comprising a carriage having clamps for the tube and its lining, means to traverse said carriage longitudinally, a driving-head, a shaft carried thereby and an expander comprising sleeves with tapered ends mounted on said shaft, one of said sleeves being movable longitudinally toward the other, a spring and nut for forcing said longitudinally-movable sleeve yieldingly toward the other, and rollers seated upon the tapered ends of said sleeves.

This specification signed and witnessed this 27th day of April, A. D. 1906.

FRANK W. WALQUIST.

In presence of—
  THOMAS J. CANTY,
  ELLA J. KRUGER.